United States Patent
Wenzel (10) Patent No.: US 10,228,945 B2
(45) Date of Patent: Mar. 12, 2019

(54) CIRCUITRY AND METHOD FOR INSTRUCTION STREAM PROTECTION

(71) Applicant: Infineon Technologies AG, Neubiberg (DE)

(72) Inventor: Andreas Wenzel, Munich (DE)

(73) Assignee: Infineon Technologies AG, Neubiberg (DE)

( * ) Notice: Subject to any disclaimer, the term of this patent is extended or adjusted under 35 U.S.C. 154(b) by 403 days.

(21) Appl. No.: 15/048,503

(22) Filed: Feb. 19, 2016

(65) Prior Publication Data

US 2016/0246984 A1   Aug. 25, 2016

(30) Foreign Application Priority Data

Feb. 24, 2015   (DE) .......................... 10 2015 203 319

(51) Int. Cl.
| | |
|---|---|
| *G06F 21/00* | (2013.01) |
| *G06F 9/30* | (2018.01) |
| *G06F 21/71* | (2013.01) |
| *G06F 21/57* | (2013.01) |
| *G06F 21/64* | (2013.01) |
| *G06F 11/30* | (2006.01) |

(52) U.S. Cl.
CPC .......... *G06F 9/30145* (2013.01); *G06F 11/30* (2013.01); *G06F 21/57* (2013.01); *G06F 21/64* (2013.01); *G06F 21/71* (2013.01)

(58) Field of Classification Search
CPC .......... G06F 21/30; G06F 21/44; G06F 21/45; G06F 21/50; G06F 21/51; G06F 21/52; G06F 21/60; G06F 21/604; G06F 21/70; G06F 21/71; G06F 21/72
See application file for complete search history.

(56) References Cited

U.S. PATENT DOCUMENTS

| | | | |
|---|---|---|---|
| 2013/0318327 A1* | 11/2013 | Gammel | G06F 9/30 712/220 |
| 2014/0082327 A1* | 3/2014 | Ghose | G06F 9/3877 712/205 |

OTHER PUBLICATIONS

German Patent Office, Office Action issued in DE 102015203319.8, 10 pgs., dated Dec. 17, 2015.

(Continued)

*Primary Examiner* — Edward Zee
(74) *Attorney, Agent, or Firm* — Schiff Hardin LLP (57) ABSTRACT

A circuitry is provided. The circuitry comprises a signature memory having stored thereon a plurality of stored signatures. Moreover, the circuitry comprises a signature generator configured to receive one or more monitored signals, and to generate a generated signature depending on at least one of the one or more monitored signals. Furthermore, the circuitry comprises one or more subunits configured to be accessed depending on at least one of the one or more monitored signals. Moreover, the circuitry comprises a protection unit configured to restrict access on the one or more subunits. Furthermore, the circuitry comprises a decision controller configured to compare the generated signature with a stored signature of the plurality of stored signatures to obtain a comparison result. The protection unit is configured to provide access to one of the one or more subunits depending on the comparison result.

14 Claims, 4 Drawing Sheets

(56) References Cited

OTHER PUBLICATIONS

Milenkovic, et al., "Using Instruction Block Signatures to Counter Code Injection Attacks", 10 pgs., ACM Sigarch Computer Architecture News, vol. 33, No. 1, Mar. 2005.
Rodriguez, et al., "Improving the Interleaved Signature Instruction Stream Technique", 4 pgs., CCECE, IEEE, 2003.

* cited by examiner

CIRCUITRY AND METHOD FOR INSTRUCTION STREAM PROTECTION

FIELD OF THE DISCLOSURE

The present disclosure relates to a circuitry and a method for instruction stream protection.

BACKGROUND AND PRIOR ART

Instruction streams, e.g., instruction steams for microarchitectures, are vulnerable and if they exhibit irregularities or if they are manipulated, severe damage may be caused.

The manipulation or, for example, an irregular property, of an executed instruction stream can be detected by implementing a security functionality called instructions stream signature. The Instruction Stream Signature (ISS) provides strong integrity protection of the program flow.

In the state of the art, the stream signature has to be tested by a dedicated software/hardware test today. According to the state of the art, a dedicated software or hardware test is executed, which generates an alarm, if the dedicated software or hardware test indicates an irregularity.

Moreover, in the state of the art, a dedicated SW- or HW-test can only generate alarm conditions when executed and that they can't prevent the execution of critical system operations. This kind of tests can be first corrupted or prevented e.g. by manipulation of the instruction execution and second can only guarantee the correct program flow at the time when the test is executed. Critical system operations before and after the SW/HW signature alarm test are not protected or prevented.

It would therefore be desirable, if improved techniques would be provided for instruction stream protection.

SUMMARY OF THE DISCLOSURE

The object of the present disclosure is to provide improved concepts for instruction stream protection.

According to an embodiment, a circuitry is provided.

The circuitry comprises a signature memory having stored thereon a plurality of stored signatures.

Moreover, the circuitry comprises a signature generator for receiving one or more monitored signals, and for generating a generated signature depending on at least one of the one or more monitored signals.

Furthermore, the circuitry comprises one or more subunits for being accessed depending on at least one of the one or more monitored signals.

Moreover, the circuitry comprises a protection unit for restricting access on the one or more subunits.

Furthermore, the circuitry comprises a decision controller for comparing the generated signature with a stored signature of the plurality of stored signatures to obtain a comparison result.

The protection unit is configured to provide access to one of the one or more subunits depending on the comparison result.

A method for controlling a circuitry, wherein the circuitry comprises one or more subunits and a signature memory having stored thereon a plurality of stored signatures. The method comprises:

Receiving one or more monitored signals.

Generating a generated signature depending on at least one of the one or more monitored signals.

Accessing at least one of the one or more subunits depending on at least one of the one or more monitored signals; wherein access on the one or more subunits is restricted by a protection unit.

Comparing the generated signature with a stored signature of the plurality of stored signatures to obtain a comparison result. And:

Providing access to one of the one or more subunits by the protection unit depending on the comparison result.

Furthermore, a computer program for implementing the above-described method when being executed on a computer or signal processor is provided.

In the following, embodiments of the present disclosure are described in more detail with reference to the figures, in which:

DETAILED DESCRIPTION OF EMBODIMENTS

Figure 1A:
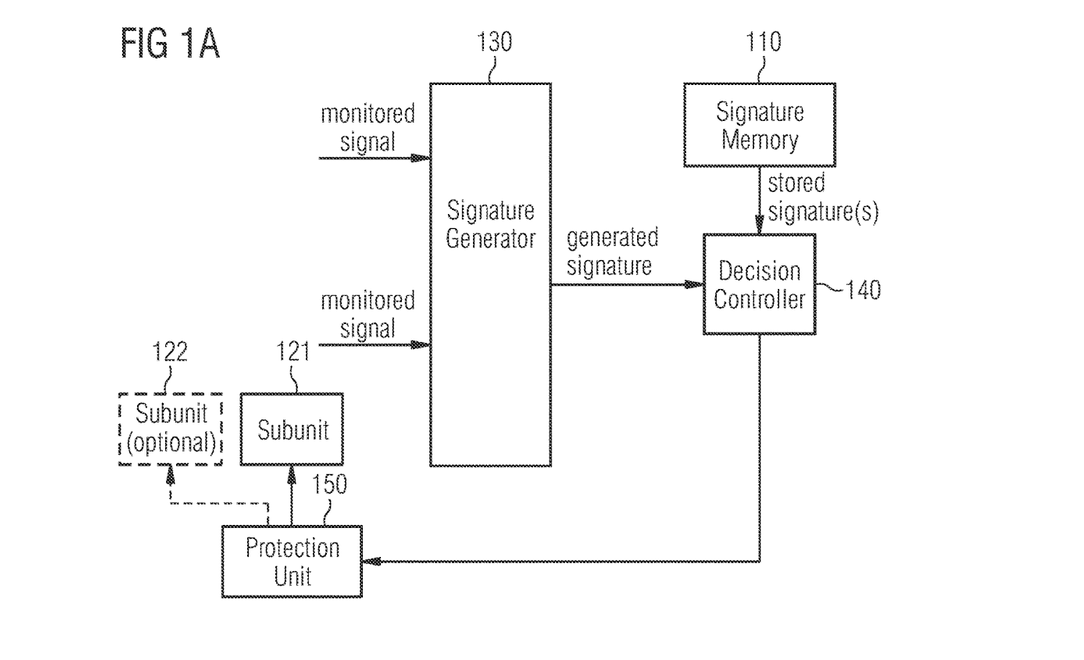
FIG. 1a illustrates a circuitry according to an embodiment.

FIG. 1a illustrates a circuitry according to an embodiment.

According to an embodiment, a circuitry is provided.

The circuitry comprises a signature memory 110 having stored thereon a plurality of stored signatures.

Moreover, the circuitry comprises a signature generator 130 for receiving one or more monitored signals, and for generating a generated signature depending on at least one of the one or more monitored signals.

Furthermore, the circuitry comprises one or more subunits 121, 122 for being accessed depending on at least one of the one or more monitored signals.

Moreover, the circuitry comprises a protection unit 150 for restricting access on the one or more subunits 121, 122.

Furthermore, the circuitry comprises a decision controller 140 for comparing the generated signature with a stored signature of the plurality of stored signatures to obtain a comparison result.

The protection unit 150 is configured to provide access to one of the one or more subunits 121, 122 depending on the comparison result.

In the circuitry according to embodiments, access to one or more subunits 121, 122 is protected by the protection unit 150. In some embodiments, the protection unit 150 allows access to the respective subunit 121 (or subunit 122), for example, if a comparison comparing a current signature of a monitored and a stored (expected) signature does not result in an irregular state.

If this is not the case, and, for example, an irregular state is indicated, in embodiments, access to the subunit may, e.g., be denied.

In some embodiments, the protection unit 150 may, for example, restrict the access to the one or more subunits 121, 122, so that access to the respective subunit 121 or 122 is denies as long as no successful comparison of a generated signature with a stored signature has been conducted. By this, the generated signature acts like a key, so that only a valid signature "unlocks" the protected subunit 121, 122 being protected by the protection unit 150.

In such embodiments, the protection unit 150 may, for example, be configured to deny access to said one of the one or more subunits 121, 122, if no comparison is conducted by the decision controller 140.

According to an embodiment, the circuitry may, e.g., be an integrated circuit.

According to an embodiment, the protection unit 150 is configured to not provide the access to said one of the one or more subunits 121, 122, if the comparison result indicates an incorrect state. In such embodiments, it is excluded that a subunit 121, 122 is accessed, if a comparison indicates an incorrect state.

In an embodiment, the decision controller 140 is configured to obtain the comparison result so that the comparison result indicates the incorrect state, if the generated signature is not equal to said stored signature of the plurality of stored signatures. In such an embodiment, (stored and generated) matching signatures indicate that no error, malfunction or critical state is indicated. The stored signature is a signature that indicates a correct state.

According to an embodiment, the decision controller 140 is configured to obtain the comparison result so that the comparison result indicates the incorrect state, if the generated signature is equal to said stored signature of the plurality of stored signatures. In such an embodiment, (stored and generated) matching signatures indicate that an error, a malfunction or a critical state is indicated. The stored signature is a signature that indicates an incorrect state.

In an embodiment, the protection unit 150 is configured to not provide the access to said one of the one or more subunits 121, 122 by not providing an opening of a firewall, if the comparison result indicates the incorrect state. In such an embodiment, a firewall is employed to provide and deny access to a subunit.

According to an embodiment, the protection unit 150 is configured to provide access to said one of the one or more subunits 121, 122, if the comparison result indicates a correct state being different from the incorrect state. In such an embodiment, access to the subunit 121 or 122 is provided if a state different from the incorrect state is indicated. Thus, in such an embodiment, access on the subunit 121 or 122 only depends on whether the comparison results in a correct or incorrect state.

In embodiments, the protection unit 150 is configured to provide access to said one of the one or more subunits 121, 122, so that a predefined sequence of one or more operations can be conducted on said one of the one or more subunits 121, 122, if the comparison result indicates said correct state. In such an embodiment, the protection unit 150 is configured to deny access to said one of the one or more subunits 121, 122, without a further comparison being conducted by the decision controller 140, after the predefined sequence of said one or more operations has been conducted on said one of the one or more subunits 121, 122. These embodiments realize the concept of atomic access. If access is allowed, all of the one or more operations are conducted on the subunit, but after these operations have been completed, another comparison of a further generated signature and a stored signature is required to again gain access on the respective subunit 121, 122.

According to an embodiment, said predefined sequence comprises two or more operations. The protection unit 150 is configured to determine whether all of the two or more operations have been conducted on said one of the one or more subunits 121, 122, after the protection unit has provided access to said one of the one or more subunits 121, 122. In such an embodiment, the protection unit 150 is configured to undo those operations of the two or more operations that have already been conducted on said one of the one or more subunits 121, 122, if not all of the two or more operations have been completely conducted on said one of the one or more subunits 121, 122. In such an embodiment, the concept of atomic access comprises further features. If not all of the two or more operations are executed on the respective subunit 121, 122, all already conducted operations are undone, e.g., by the protection unit 150.

For example, if an operation shall be conducted on the respective subunit 121, before all of the operations of the predefined sequence have been conducted, all already conducted operations of the sequence may, for example, be undone.

Or, for example, if, after a predefined time interval, not all operations of the sequence have been conducted on the respective subunit 121, 121, the protection unit 150 conducts an undo to revert the already conducted operations of the sequence.

In embodiments, the signature generator 130 is configured to generate the generated signature depending on a current state of said at least one of the one or more monitored signals and depending on one or more previous states of said at least one of the one or more monitored signals. Such embodiments take a history of the monitored signals into account. Not only the current state of the monitored signals, but also one or more of their previous states are taken into account.

According to some embodiments, each of the one or more monitored signals may, e.g., depend on an instruction stream of at least one of the one or more subunits 121, 122. So, in embodiments, the signature generator 130 may, e.g., be configured to generate the generated signature depending on each instruction stream of said at least one of the one or more subunits 121, 122.

For example, at least one of the one or more subunits 121, 122 may, e.g., be a processor, and each of the one or more monitored signals may, e.g., be generated from the instruction stream of one of the at least one processor.

In FIG. 1a, two subunits 121 and 122 are illustrated, wherein the second subunit 122 is optional. In some embodiments, however, the circuitry indeed also comprises the second subunit 122.

According to an embodiment, the circuitry comprises two or more subunits 121, 122 (the one or more subunits mentioned above are then two or more subunits 121, 122). The signature generator 130 is configured to receive two or more monitored signals as the one or more monitored signals. The signature generator 130 is configured to generate the generated signature depending on a first monitored signal of the two or more monitored signals. Moreover, the signature generator 130 is configured to generate a further signature depending on a second monitored signal, being different from the first monitored signal, of the two or more monitored signals. The decision controller 140 is configured to compare the generated signature with said stored signature of the plurality of stored signatures to obtain said comparison result. The protection unit 150 is configured to provide access to a first one of the one or more subunits 121, 122 depending on the comparison result. The decision controller 140 is configured to compare the further signature with another signature of the plurality of stored signatures to obtain another comparison result. The protection unit 150 is configured to provide access to a second one of the one or more subunits 121, 122, being different from said first one of the one or more subunits, depending on said another comparison result. In such an embodiment, access on two subunits 121, 122 is protected by the protection unit 150.

In some embodiments, all subunits of two more subunits, or all subunits of three or more subunits are protected by the protection unit 150.

Figure 1B:
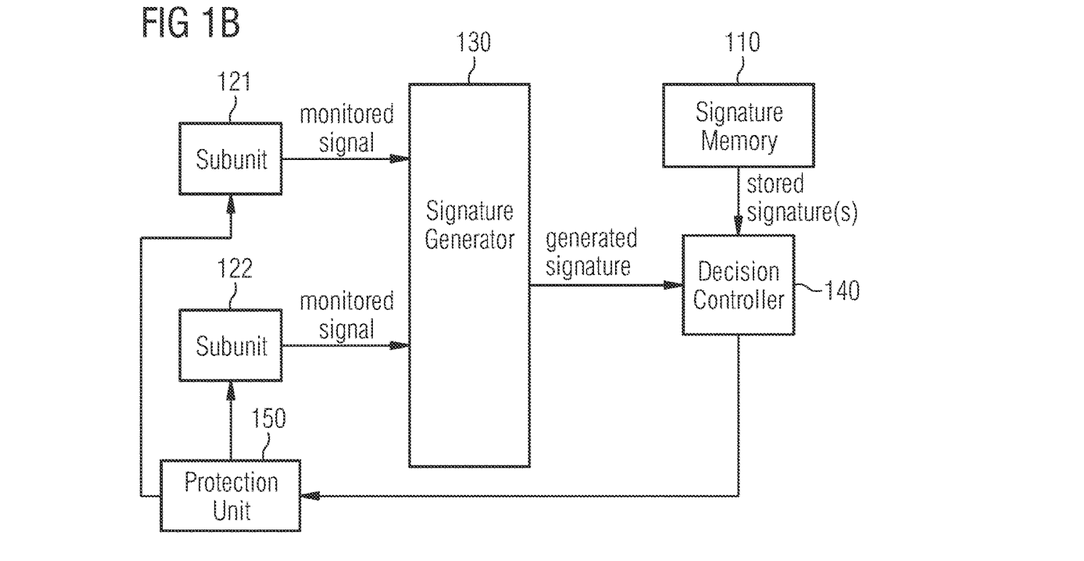
FIG. 1b illustrates a circuitry according to another embodiment further comprising two or more subunits.

FIG. 1b illustrates a circuitry according to a further embodiment.

The circuitry of FIG. 1b comprises two or more subunits 121, 122 as said one or more subunits 121, 122.

The signature generator 130 is configured to receive a first monitored signal of the two or more monitored signals being provided by a first subunit 121 of the two or more subunits 121, 122. Moreover, the signature generator 130 is configured to generate said generated signature depending on said first monitored signal.

The decision controller 140 is configured to compare the generated signature with a stored signature of the plurality of stored signatures to obtain a comparison result.

The protection unit 150 is configured to provide access for the first subunit to a second subunit 122 of the two or more subunits 121, 122 depending on the comparison result.

In such an embodiment, the first subunit 121 may, for example, try to gain access on the second subunit 122. Access for the first subunit 121 on the second subunit 122 may, for example, only be allowed by the protection unit 150, if a comparison of the generated signature and the stored signature does not result in an incorrect state.

Figure 2:
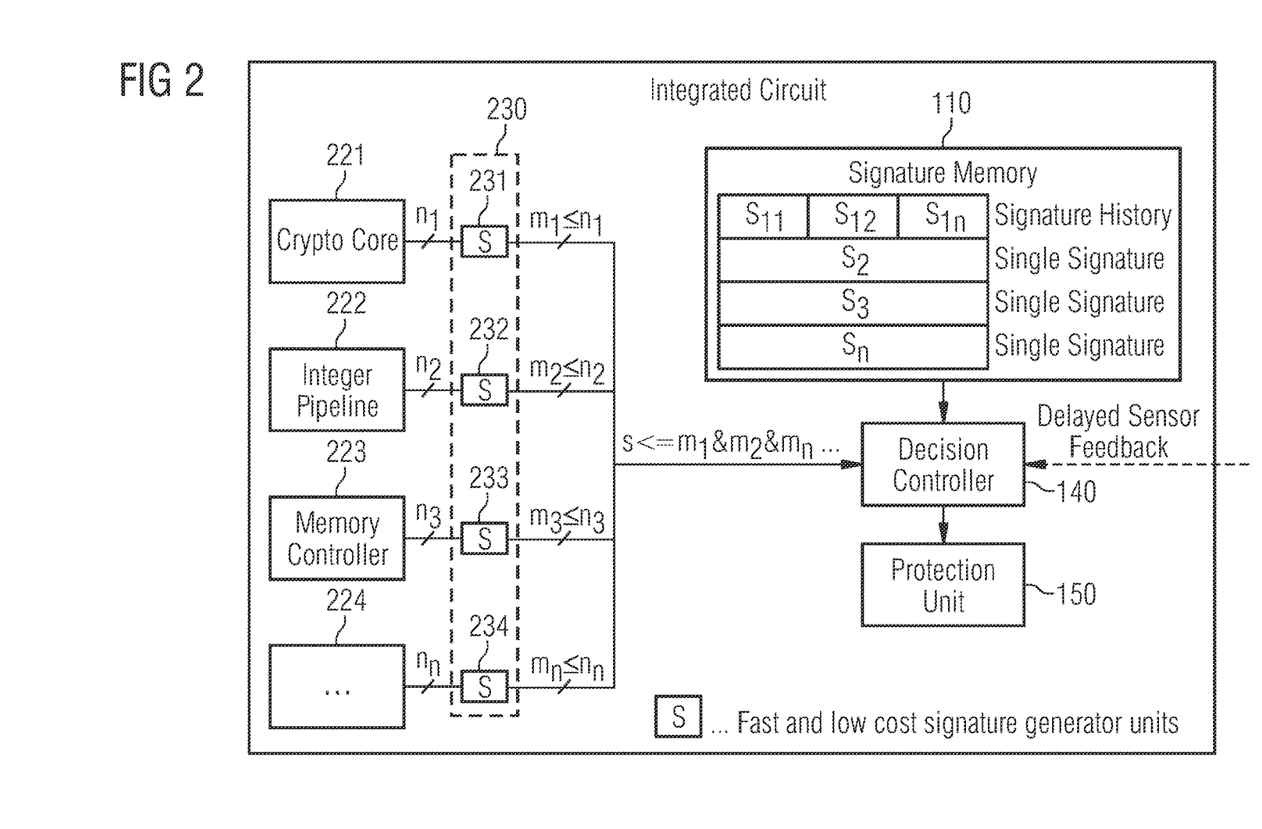
FIG. 2 illustrates an integrated circuit according to an embodiment employing individual signatures and being adapted to cope with hazardous peak power consumption and supply voltage drops.

FIG. 2 illustrates a circuitry according to a further embodiment. The signature generator is indicated by reference sign 230. The circuitry comprises three or more subunits 221, 222, 223, 224 as said one or more subunits. A first one of the one or more subunits 221, 222, 223, 224 is a processor 221 (in FIG. 2: a processor constructed for executing cryptographic operations: a crypto core). A second one of the one or more subunits is an integer pipeline 222. A third one of the one or more subunits 221, 222, 223, 224 is a memory controller 223.

In other embodiments, a first one of the one or more subunits may, for example, be a processor, a second one of the one or more subunits may, for example, be a peripheral, and a third one of the one or more subunits may, for example, be a memory controller. A peripheral may, for example, be a communication peripheral, or the peripheral may, for example, be a random number generator, or the peripheral may, for example, be a timer.

In the following, the monitored signals may also be referred to as internal signals of the circuitry.

If, in the following reference is made to an integrated circuit, it is apparent that all explanations are equally applicable to the circuitries of FIG. 1a and FIG. 1b.

In the following, particular embodiments are described.

As already explained, the manipulation or, for example, an irregular property, of an executed instruction stream can be detected by implementing a security functionality called instructions stream signature. The Instruction Stream Signature (ISS) provides strong integrity protection of the program flow.

According to embodiments, a system, and, in particular, its one or more instruction streams are protected by dedicated hardware which even allows protecting the system against manipulations continuously. In embodiments, the system may, e.g., even be protected, if the program flow is corrupted by executing a random instruction stream or another unpredictable program sequence which may not be protected by one or more instruction stream signatures (ISS), what may, e.g., mean that also no SW/HW test function is available.

Embodiments may, for example, comprise some or all of the following modules that are employed to realize the desired protection:
  a signature generator, and/or
  a tool which is configured to calculate signature reference values; and/or
  a programmable hardware firewall.

According to embodiments, every instruction of the program flow has assigned one dedicated instruction stream signature (ISS) value at runtime which may, for example, have been pre-calculated with the signature calculation tool.

This dedicated signature may be used as a key to unlock the hardware firewalls.

According to embodiments, only if the pre-calculated expected signature value fits (for example, is equal) to the instruction signature value of the executed instruction (calculated in the signature generator) the hardware firewall opens a door for this instruction (or additionally also the following instructions or operations).

An algorithm according to an embodiment may, for example, be configured as follows:
a) Initialize hardware firewall with pre-calculated key reference values e.g. calculate an instruction stream signature (ISS) reference value of a "load"—operation of critical data from key storage, configure firewall with pre-calculated ISS reference value
b) Execute program flow with the ISS
   1. In case of a correct execution, the next instruction may, e.g., be a "load"—operation
   2. In case of corrupted executions with or without ISS, the firewall may, e.g., protect (e.g., deny) any forbidden accesses to protected resources
c) Regarding a critical instruction which wants to unlock firewall is executed
   1. In case of a correct instruction flow execution, the ISS signature value will fit to reference value in firewall and the access/operation is allowed.
   2. In case, the instruction is executed but the instruction stream was corrupted somewhere, access is denied, and for example, an alarm may, e.g., be indicated.
d) In case of a correct successful unlock of the firewall, depending of the configuration, the firewall may, for example, be locked again, or may, for example, be open for several instructions, or may, for example, be open until it is closed again.

In some embodiments, the firewall may, for example, be implemented in a peripheral to protect dedicated resources, or may, for example, be implemented in a MPU or MMU to protect the memory system, in a bus-system or can be implemented together to protect other chip-features (ALU (no operation with critical data), registerfile etc.)

In the following, further particular embodiments are described.

According to some embodiments, internal signals of an integrated circuit (IC) may, for example, be observed. A low-cost and fast signature generator 130 may, for example, be used to compute a reduced-size signature of the observed signals of the integrated circuit for each clock cycle. By the thus generated signature, the whole activity of the integrated circuit may, e.g., be represented in a compressed way.

Then, the generated signature may, for example, be compared to hazardous signatures and signature histories, which were stored in a memory beforehand.

Moreover, further embodiments relate to the generation of accurate and compressed microarchitecture signatures and their usage to detect and prevent fault induction attacks by implementing a signature-dependent peripheral access control.

Now, implementation examples are described which may, e.g., relate to power management.

FIG. 2 illustrates an integrated circuit according to an embodiment employing individual signatures. FIG. 2 depicts subunits 221-224, in particular, crypto core 221, integer pipeline 222, memory controller 223 and a further subunit 224.

Moreover, FIG. 2 illustrates a signature generator 230, which itself comprises four signature generator units 231, 232, 233 and 234.

All elements of the integrated circuit of FIG. 2 are observed by means of relevant signals. Based on these signals, low cost signatures are computed for each clock cycle. This compressed signatures may, for example, represent the states of the subunits 221, 222, 223, 224. A decision controller 140 may, for example, compare each clock cycle if the one or more current signatures matches a saved signature within a dedicated memory. This comparison may, e.g., be carried out with an error tolerant approach to reduce the influence of small signature deviations. In some embodiments, the saved signatures may, for example, be identified and recorded beforehand during a characterization process with the help of benchmarking applications and dedicated attack scenarios.

Now embodiments are described which may, e.g., relate to security monitoring and peripheral access control.

E.g., a secured memory area, which contains a secret key, is may, for example, only be allowed to be accessed while the cryptographic coprocessor is active. An access to this secured memory area at any other given point in time may, for example, represent a forbidden system state. Such an invalid subunit state may be provoked, for example, by an adversary who intentionally injected faults. Such an invalid state may, e.g., be detected by generating a signature depending on the actual state of the monitored signal of one of the subunits 221, 222, 223, 224. A signature is generated which depends on the monitored signal and the such generated signature is compared with one or more stored signatures. The stored signatures are saved within a signature stream memory either in form of a signature chain (see FIG. 3) or processed representation of a chain (in case of an instruction stream signature, see FIG. 4).

Figure 3:
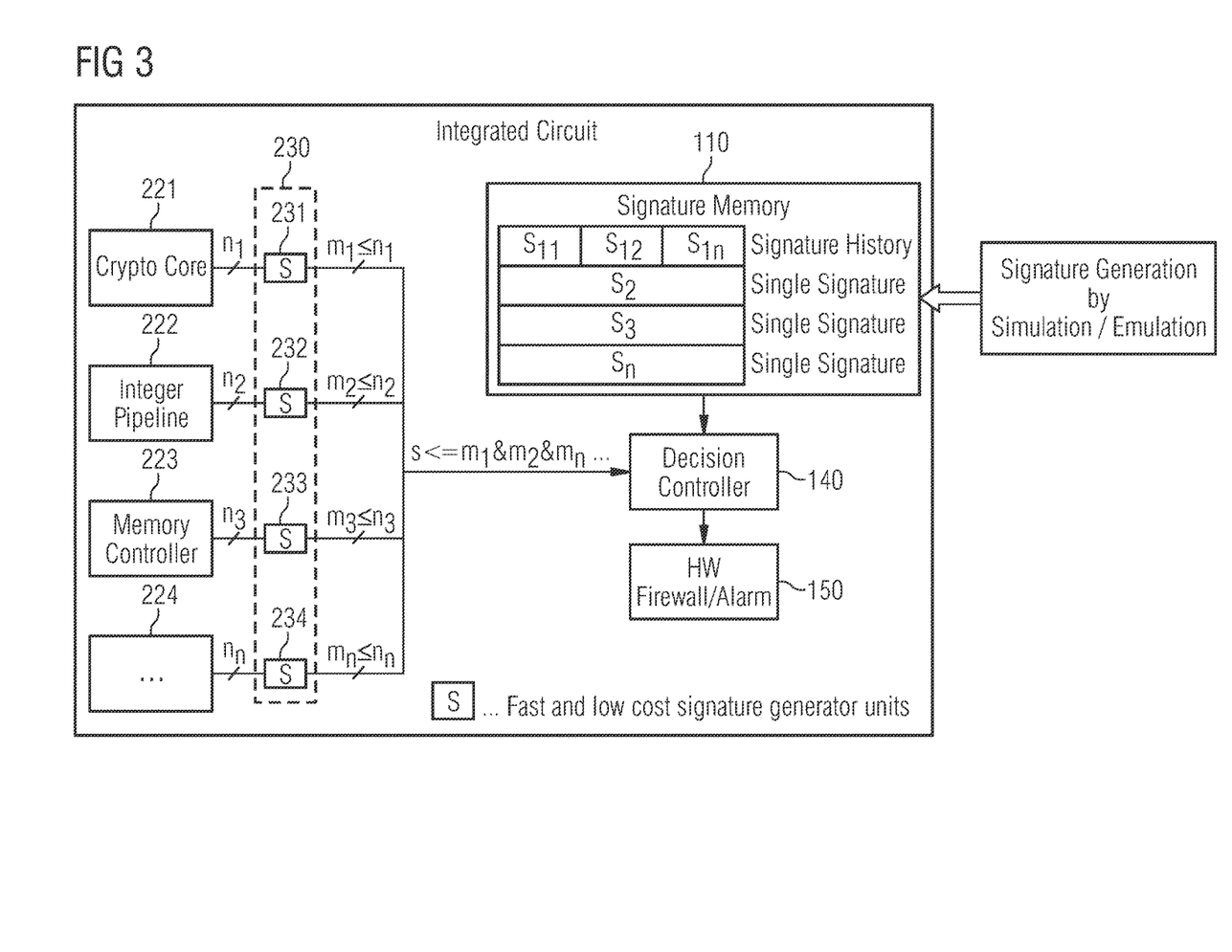
FIG. 3 illustrates an integrated circuit according to another embodiment employing a hardware firewall and alarm unit.

In FIG. 3, an integrated circuit according to another embodiment employing a hardware firewall and alarm unit is illustrated.

Figure 4:
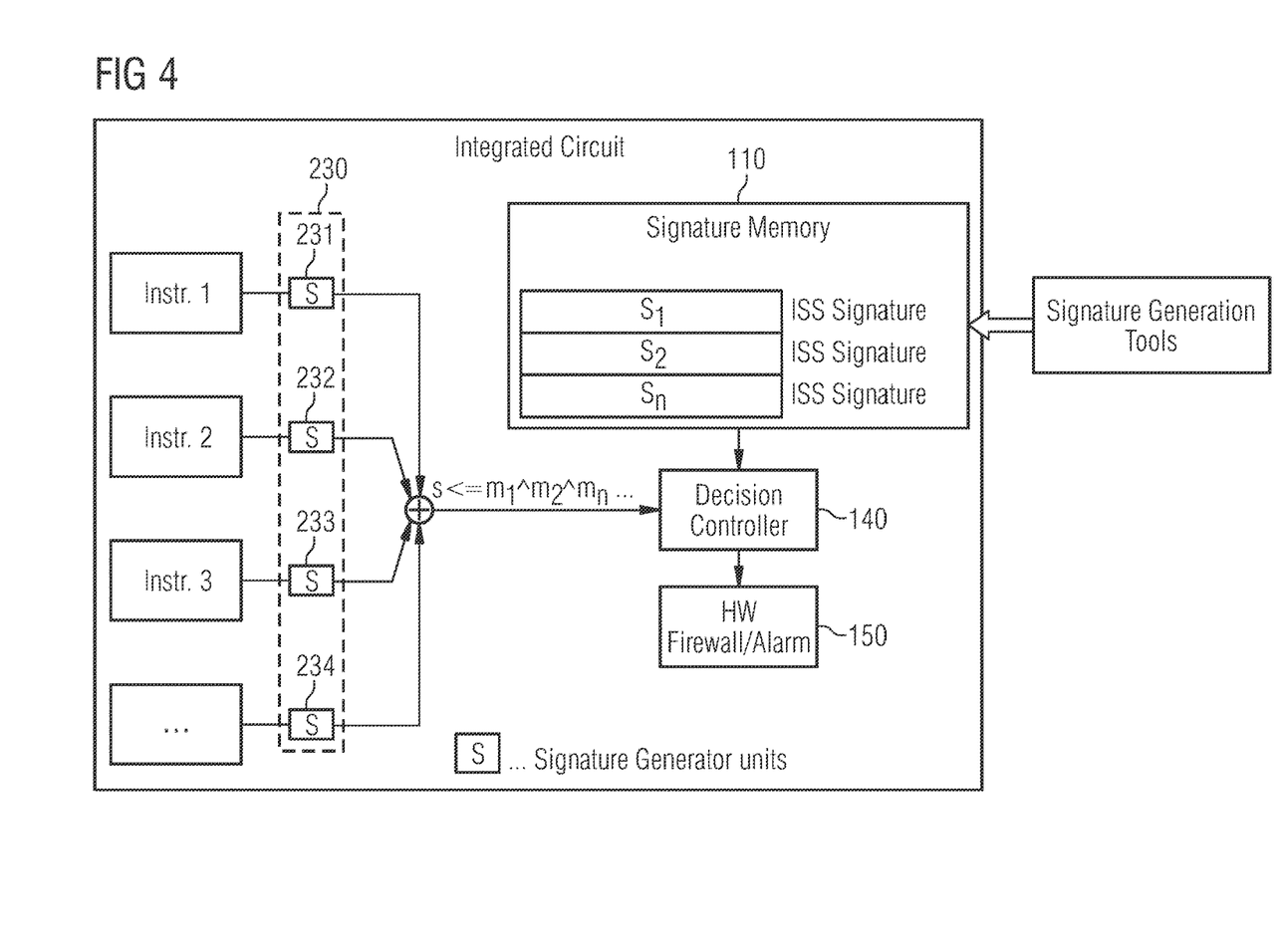
FIG. 4 illustrates an integrated circuit according to a further embodiment employing an instruction stream signature based access control.

Moreover, in FIG. 4, an integrated circuit according to a further embodiment employing an instruction stream signature based access control is illustrated.

For example, if a generated signature mismatches a certain stored signature, a forbidden subunit state and thus a forbidden system state (an incorrect/irregular system state) is detected. In this certain mismatch case, it can be concluded that an attempt to access a secure memory area is conducted while the crypto co-processor is not active. This may, for example, violate a predefined security guideline (the secure memory is only allowed to be accessed while the crypto co-processor is active) and the protection unit 150 denies access to the respective subunit 221, 222, 223 and/or 224, and by not allowing a needed opening in a hardware firewall. In some embodiments, additionally, for example, an alarm may, e.g., be indicated, a security trap may be activated, and/or a chip reset may, e.g., be conducted.

It is advantageous that the preparation of the signature chain or instruction stream signature memory 110 cannot be skipped by a fault attack, as this would automatically invalidate the signature comparison value.

Moreover, the check if the initialization value and the comparison signature are fitting is not a single event that is independent of the computation before. A disruption of the computation will always change the instruction stream signature or signature chain and therefore, invalidate the comparison value.

Furthermore, the signature chain or instruction stream signature memory only has to be prepared once, therefore, the performance impact is limited compared to peripheral access sequences that have to be done for every peripheral access.

Moreover, no additional hardware and time effort has to be spent to prevent data loss from this signature chain or instruction stream signature memory, as this information is not a security asset.

Although some aspects have been described in the context of a system, it is clear that these aspects also represent a description of the corresponding method, where a block or device corresponds to a method step or a feature of a method step. Analogously, aspects described in the context of a method step also represent a description of a corresponding block or item or feature of a corresponding system.

The inventive decomposed signal can be stored on a digital storage medium or can be transmitted on a transmission medium such as a wireless transmission medium or a wired transmission medium such as the Internet.

Depending on certain implementation requirements, embodiments of the disclosure can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the disclosure comprise a non-transitory data carrier having electronically readable control signals, which are capable of cooperating with a programmable computer system, such that one of the methods described herein is performed.

Generally, embodiments of the present disclosure can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present disclosure. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The invention claimed is:

1. A circuitry comprising:
a signature memory having stored thereon a plurality of stored signatures;
a signature generator configured to receive one or more monitored signals, and to generate a generated signature depending on at least one of the one or more monitored signals;
one or more subunits configured to be accessed depending on at least one of the one or more monitored signals;
a decision controller configured to compare the generated signature with a stored signature of the plurality of stored signatures to obtain a comparison result; and
a protection unit configured to provide or deny access to one of the one or more subunits based on the comparison result, wherein the protection unit is configured to:
deny access to said one of the one or more subunits if the comparison result indicates an incorrect state;
provide access to said one of the one or more subunits, if the comparison result indicates a correct state that is different from the incorrect state, so that a predefined sequence of one or more operations can be conducted on said one of the one or more subunits; and
deny access to said one of the one or more subunits without a further comparison being conducted by the decision controller, after the predefined sequence of said one or more operations has been conducted on said one of the one or more subunits.

2. A circuitry according to claim 1, wherein the circuitry is an integrated circuit.

3. A circuitry according to claim 1, wherein the decision controller is configured to obtain the comparison result so that the comparison result indicates the incorrect state, if the generated signature is not equal to said stored signature of the plurality of stored signatures.

4. A circuitry according to claim 1, wherein the decision controller is configured to obtain the comparison result so that the comparison result indicates the incorrect state, if the generated signature is equal to said stored signature of the plurality of stored signatures.

5. A circuitry according to claim 1, wherein the protection unit is configured to deny the access to said one of the one or more subunits by not providing an opening of a firewall, if the comparison result indicates the incorrect state.

6. A circuitry according to claim 1,
wherein said predefined sequence comprises two or more operations,
wherein the protection unit is configured to determine whether all of the two or more operations have been conducted on said one of the one or more subunits, after the protection unit has provided access to said one of the one or more subunits, and
wherein the protection unit is configured to undo those operations of the two or more operations that have already been conducted on said one of the one or more subunits, if not all of the two or more operations have been completely conducted on said one of the one or more subunits.

7. A circuitry according to claim 1, wherein the protection unit is configured to deny access to said one of the one or more subunits, if no comparison is conducted by the decision controller.

8. A circuitry according to claim 1, wherein the signature generator is configured to generate the generated signature depending on a current state of said at least one of the one or more monitored signals and depending on one or more previous states of said at least one of the one or more monitored signals.

9. A circuitry according to claim 1, wherein each of the one or more monitored signals depends on an instruction stream of at least one of the one or more subunits.

10. A circuitry according to claim 1,
wherein the circuitry comprises two or more subunits as said one or more subunits,
wherein the signature generator is configured to receive a first monitored signal of two or more monitored signals being provided by a first subunit of the two or more subunits,
wherein the signature generator is configured to generate said generated signature depending on said first monitored signal,
wherein the decision controller is configured to compare the generated signature with a stored signature of the plurality of stored signatures to obtain the comparison result, and
wherein the protection unit is configured to provide access for the first subunit to a second subunit of the two or more subunits depending on the comparison result.

11. A circuitry according to claim 1,
wherein the circuitry comprises three or more subunits as said one or more subunits,
wherein a first one of the one or more subunits is a processor,
wherein a second one of the one or more subunits is a peripheral, and
wherein a third one of the one or more subunits is a memory controller.

12. A circuitry according to claim 1,
wherein the circuitry comprises two or more subunits as the one or more subunits,
wherein the signature generator is configured to receive two or more monitored signals as the one or more monitored signals,
wherein the signature generator is configured to generate the generated signature depending on a first monitored signal of the two or more monitored signals,
wherein the signature generator is configured to generate a further signature depending on a second monitored signal, being different from the first monitored signal, of the two or more monitored signals, wherein the decision controller is configured to compare the generated signature with said stored signature of the plurality of stored signatures to obtain said comparison result, wherein the protection unit is configured to provide access to a first one of the one or more subunits depending on the comparison result, wherein the decision controller is configured to compare the further signature with another signature of the plurality of stored signatures to obtain another comparison result, and wherein the protection unit is configured to provide access to a second one of the one or more subunits, being different from said first one of the one or more subunits, depending on said another comparison result.

13. A method for controlling a circuitry including one or more subunits and a signature memory having stored thereon a plurality of stored signatures, the method comprising:

receiving one or more monitored signals;

generating a generated signature depending on at least one of the one or more monitored signals;

accessing at least one of the one or more subunits depending on at least one of the one or more monitored signals;

comparing the generated signature with a stored signature of the plurality of stored signatures to obtain a comparison result; and providing access to one of the one or more subunits by a protection unit depending on the comparison result, wherein:

access to said one of the one or more subunits is denied if the comparison result indicates an incorrect state;

access to said one of the one or more subunits is provided, if the comparison result indicates a correct state that is different from the incorrect state, so that a predefined sequence of one or more operations can be conducted on said one of the one or more subunits; and access to said one of the one or more subunits is denied without a further comparison being conducted, after the predefined sequence of said one or more operations has been conducted on said one of the one or more subunits.

14. A non-transitory computer readable medium storing a computer program thereon, when executed, causes a computer or signal processor to perform the method of claim 13.

* * * * *